United States Patent [19]

Kobayashi et al.

[11] 4,399,901

[45] Aug. 23, 1983

[54] STROKE SELF-ADJUSTING MECHANISM FOR A CONTROL CABLE

[75] Inventors: Tetuo Kobayashi, Ikeda; Noboru Hagiwara, Nishinomiya, both of Japan

[73] Assignee: Nippon Cable System Inc., Hyogo, Japan

[21] Appl. No.: 252,285

[22] Filed: Apr. 9, 1981

[30] Foreign Application Priority Data

Sep. 10, 1980 [JP] Japan ............................ 55-129404[U]

[51] Int. Cl.³ .............................................. F16D 13/75
[52] U.S. Cl. ............................ 192/111 A; 188/196 V; 74/501.5 R; 74/512; 74/531
[58] Field of Search ...................... 74/501.5, 531, 512; 192/111 A, 111 R, 995, 70.25; 188/196 V, 196 F, 196 R, 196 P

[56] References Cited

U.S. PATENT DOCUMENTS

| 2,222,492 | 11/1940 | Snell ........................................ 74/531 |
| 2,229,857 | 1/1941 | Lucker ..................................... 74/531 |
| 2,233,329 | 2/1941 | Sprink ...................................... 74/531 |
| 2,299,508 | 10/1942 | Skareen .................................... 74/531 |
| 3,117,466 | 1/1964 | Hinsey ..................................... 74/531 |
| 3,621,959 | 11/1971 | Gale et al. ............................ 192/111 A |

FOREIGN PATENT DOCUMENTS 2037926  7/1980  United Kingdom ........... 192/111 A

Primary Examiner—Kenneth Dorner
Assistant Examiner—Anthony W. Raskob, Jr.
Attorney, Agent, or Firm—Armstrong, Nikaido, Marmelstein & Kubovcik

[57] ABSTRACT

A stroke self-adjusting mechanism for a control cable comprising an adjusting member, such as adjusting lever or cam plate, having first and second locking pins and pivotally connected to the inner cable by a movable pin, and a lever provided with first and second surfaces; and therefore while the adjusting member is freely moved against the lever in the rest state of the lever to adjust an expansion or contraction of the inner cable, the first and the second locking pins being contacted with and being pressed against each of the above lock surfaces by the rotation of the lever to lock the adjusting member to the lever so as to be able to enoughly operate the inner cable.

7 Claims, 10 Drawing Figures

FIG. 1
FIG. 2
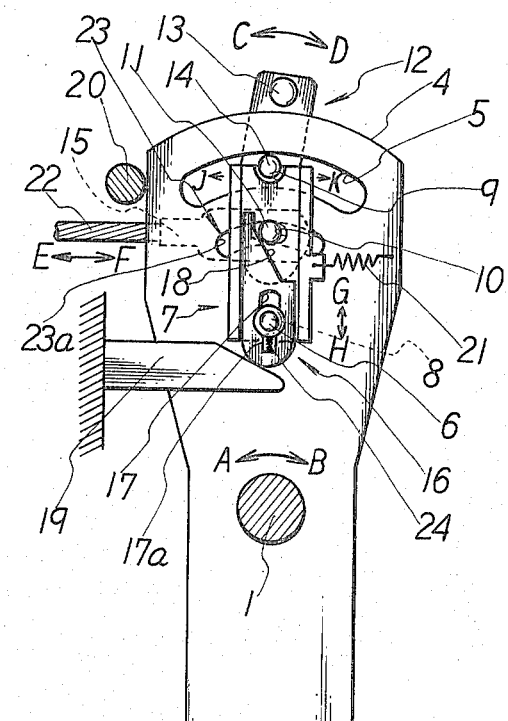
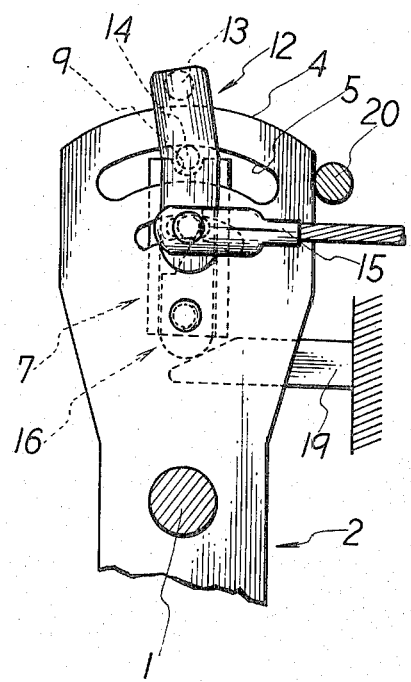

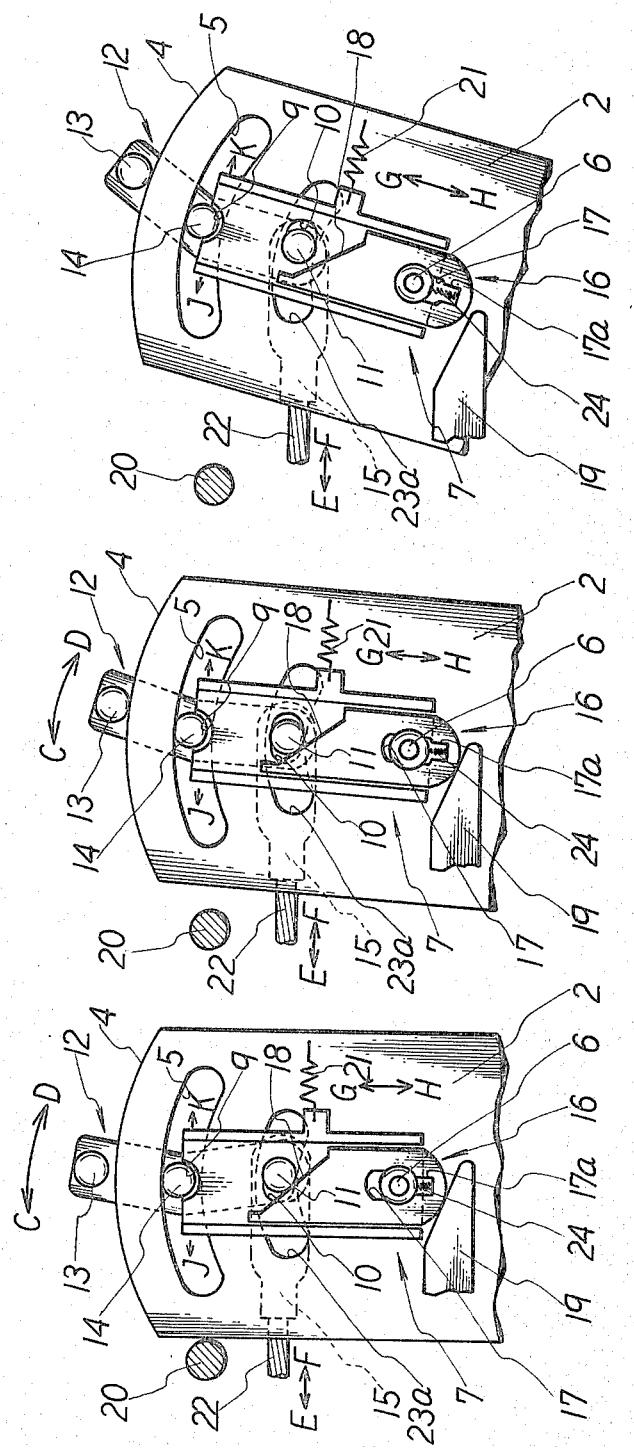

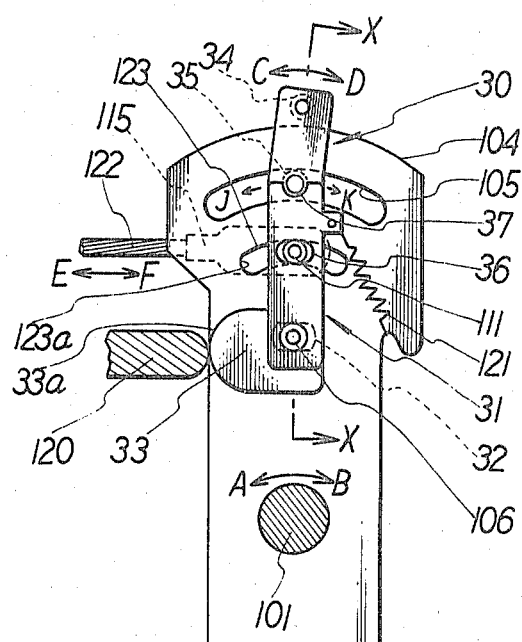
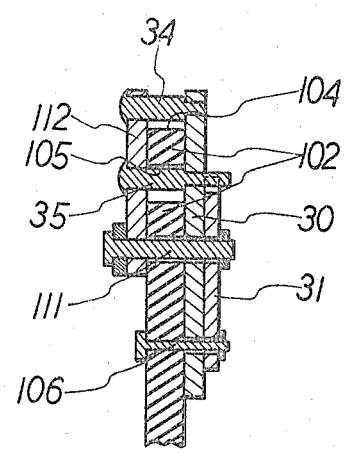
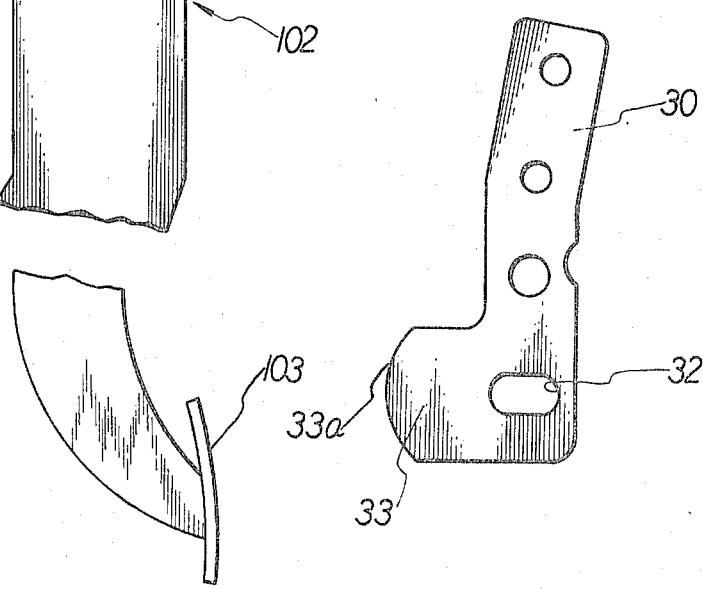
FIG. 6
FIG. 7
FIG. 8

FIG. 9
FIG. 10
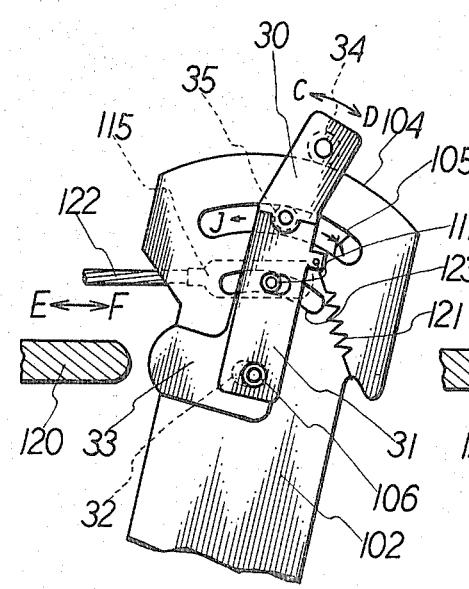
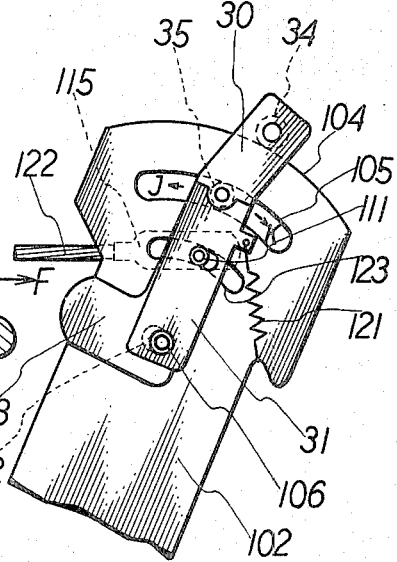

STROKE SELF-ADJUSTING MECHANISM FOR A CONTROL CABLE

BACKGROUND OF THE INVENTION

The present invention relates to a stroke self-adjusting mechanism for a control cable, and more particularly to a mechanism for remotely operating a working device through the control cable by an operating device such as lever in vehicle, or the like.

The control cable consists essentially of a flexible conduit and a flexible inner cable slidably inserted into the conduit. The conduit is mounted on the vehicle body by fittings provided to the both ends thereof, and the tension load added to the one end of the inner cable in the operating side is transmitted to the working device connected to the other end of the inner cable.

The inner cable consists of a strand of hard-steel wires, and in a motor vehicle, is used for the remote control in clutch, brake or accelerator. However, especially in the clutch and the brake mechanisms, the inner cable cannot avoid causing expansion or slack gradually due to repeating of push-pull operations under the heavy tension. Therefore, since the smooth operations of the clutch and brake are inhibited, the inner cable should be adjusted by an adjusting screw or the like as occasion demands. However, such an adjustment of the inner cable is very inconvenient in handling. Thus, it is desirable to adjust automatically the inner cable.

In the clutch mechanism in the vehicle, when a clutch plate is worn, a clutch release lever contacts strongly with a clutch release bearing, and then pushes a clutch operating fork. As a result, the inner cable is pulled as if the inner cable shrinks. In that case, though it is also required to adjust the inner cable by the adjusting screw or the like, the adjustment with the screw is very inconvenient.

A few suggestions of the stroke self-adjusting mechanism has been made in order to exclude the disadvantages described above. However, all the mechanisms suggested are those for applied to only the expansion or slack of the inner cable. For example, U.S. Pat. No. 3,621,959 discloses a self-adjusting clutch release mechanism comprising a ratchet member pivotally connected to a clutch pedal and connected to the inner cable, and a pawl pivotally connected to the pedal and engaging with the ratchet member. The pawl disengages from the ratchet member when the pedal is held against the stop. Thus, a spring connected to the ratchet member takes up the expansion or slack of the inner cable automatically. However, the mechanism suggested is very complex. Especially, if ratchet teeth which can carry out the micro-adjustment are employed, they cannot endure in the heavy load, and on the other hand, if ratchet teeth which can endure the heavy load are employed, they result in rough-adjustment. In addition, the mechanism suggested in unsatisfied in the stroke adjustment of the inner cable. Also, when the vehicle is running, the distance of both fitting positions for connecting both ends of the conduit is slightly variable due to any strain of the vehicle body. As a result, the inner cable shows apparent expansion and contraction as if the inner cable itself is expanded and contracted. Especially, the apparent expansion results in functioning the self-adjusting mechanism. For example, in the clutch mechanism, the apparent expansion keeps the clutch plate to the incompletely clutched state while the vehicle is running, finally causing burning damages of the clutch plate, and in the brake mechanism, the apparent expansion keeps the brake to the working state, due to absorbing and adjusting the apparent expansion automatically in the similar manner to the clutch, finally causing burning damages of a brake lining. Furthermore, it is impossible that the contraction of the inner cable as described above is adjusted by the coventional self-adjusting mechanism.

OBJECTS OF THE INVENTION

The main object of the invention is to provide a stroke self-adjusting mechanism which can automatically adjust an expansion and contraction of an inner cable in a control cable of clutch, brake or the like.

The further object of the invention is to provide a stroke self-adjusting mechanism which can lock a movable pin connected to an end fitting of an inner cable to a lever at a suitable position, and can freely move the movable pin in the rest state of the lever to adjust the expansion and contraction of the inner cable.

The more further object of the invention is to provide a stroke self-adjusting mechanism which can smoothly carry out the remote control by employing the control cable under the heavy tension load.

Other objectives and advantages of the invention will become apparent from the following description.

BRIEF DESCRIPTION OF THE DRAWINGS

FIG. 1 is a schematically front view for showing an embodiment in the case that a stroke self-adjusting mechanism of the invention is applied to a clutch pedal lever;

FIG. 2 is a reverse view of the mechanism shown in FIG. 1;

FIGS. 3 to 5 are partially front views for explaining the function of the mechanism shown in FIG. 1;

FIG. 6 is a schematically front view for showing other embodiment of the invention;

FIG. 7 is a sectional view taken along line X—X of FIG. 6;

FIG. 8 is a schematically front view for showing a cam plate in FIG. 6; and

FIGS. 9 to 10 are partially front view for explaining the function of the mechanism shown in FIG. 6.

DETAILED EXPLANATION OF THE INVENTION

In FIGS. 1 to 5, indicated as 1 is a shaft mounted on a vehicle (not shown), 2 is a clutch pedal lever (hereinafter referred to as lever) pivotally connected to the shaft 1, and 3 is a clutch pedal. The lever 2 is provided with both a first lock surface 4 having a circular arc shape at the upper end thereof and a second lock surface 5 having a circular arc shape, positioning below the first lock surface 4 and being almost concentric with the first lock surface 4. Also, a fixed pin 6 is provided at a center area of radius in the first and the second lock surfaces. The fixed pin 6 is inserted through a hole 8 of a guide plate 7 to thereby fix rotatably the guide plate 7 to the lever 2. The guide plate 7 has a laterally extending hole 10, and has a nearly hemicircular notch 9 at the upper end thereof.

An adjusting lever 12 is disposed to a back surface of the lever 2, and a movable pin 11 provided at one end of the adjusting lever 12 is inserted through a hole 23 having a circular arc shaped into the laterally extending hole 10 of the guide plate 7 so as to be slidably moved along the laterally extending hole 10. The adjusting lever 12 is pivotally connected through the movable pin 11 to an end fitting 15 to which an inner cable 22 is fixed.

A first locking pin 13 and a second locking pin 14 are provided on the adjusting lever 12 at the suitable position. The first and the second locking pins 13 and 14 are contacted with and are pressed against the first and the second lock surfaces 4 and 5 respectively to lock the adjusting lever 12 when the adjusting lever 12 is rotated around the fixed pin 6 in the direction D by rotating the lever 2 in the direction B in order to pull the inner cable 22 in the direction F. Also, the second locking pin 14 is engaged with the notch 9 formed to the above guide plate 7.

The release of the adjusting lever 12 locked is carried out by a lock-releasing plate 16 having a vertically extending hole 17 which is pivotally engaged with the pin 6 at one end thereof and having a lock-releasing pawl 18 at the other end thereof. The lock-releasing plate 16 can slidably move in the direction G or H within the guide plate 7 by the above vertically extending hole 17, and the lock-releasing pawl 18 is contacted with the movable pin 11 by the slide of the lock-releasing plate 16.

The lock-releasing plate 16 is formed as a circular arc shape in lower edge thereof, and is contacted with a lock-releasing stopper 19 having a oblique plane. When the lever 2 is rotated in the direction B, the lock-releasing plate 16 is pushed down in the direction H along the oblique plane of the lock-releasing stopper 19 to release the lock-releasing pawl 18 from the movable pin 11. In that case, preferably the small hole 17a is provided at the lower end of the vertically extending hole 17 in the plate 16, and a coil spring 24 is provided in the small hole 17a to contact with the fixed pin 6 in one end thereof, so that the lock-releasing plate 16 is securely pushed down in the direction H.

The rotation of the lever 2 in the direction A is stopped at a certain position by a stopper 20. The guide plate 7 is energized in the direction K by a spring 21. One side surface of the hole 23 in the lever 2 functions as a safe stopper 23a for inhibiting a overrotation of the adjusting lever 12 in the direction D by the contact with the movable pin 11.

The functions and advantages of the invention will be explained in the following description accompanying with FIGS. 3 to 5.

When the pedal 3 is depressed from its rest state shown in FIG. 3 or FIG. 1 to rotate in the direction B, the lock-releasing plate (hereinafter referred to as release plate) 16 which contacts with the lock-releasing stopper (hereinafter referred to as release stopper) 19 is initially moved in the direction H as shown in FIG. 4 by the spring 24 to release the movable pin 11 contacted with the lock-releasing pawl (hereinafter referred to as release pawl) 18, whereby the movable pin 11 is slightly moved in the direction J. Thus, the second locking pin 14 is contacted with and is pressed against the second lock surface 5, and simultaneously the adjusting lever 12 is rotated around the second locking pin 14 in the direction D, whereby the first locking pin 13 is contacted with and is pressed against the first lock surface 4 to inhibit the rotation of the adjusting lever 12. Simultaneously, the adjusting lever 12 is fixed at the pressed position, and is combined with the guide plate as a unit. When the pedal is further rotated the inner cable 22 fixed to the end fitting 15 is pulled in the direction F as shown in FIG. 5 to operate enoughly a working device (not shown).

In the state shown in FIG. 5, when the pedal 3 is released from its depression, the lever 2 is returned in the direction A by a return spring (not shown), and during the return, the release plate 16 comes into contact with the release stopper 19 to move slidably in the direction G. Thus, the release pawl 18 comes into contact with the movable pin 11, and moves the movable pin 11 in the direction K. As a result, the adjusting lever 12 is rotated in the direction C around the second locking pin 14 supported by the notch 9 to release completely the lock, thereby returning to its rest state shown in FIG. 3.

In the rest state, the adjusting lever 12 is free from the lock, and is freely movable in the direction J or K, since the release pawl 18 contacts with the movable pin 11. Therefore, for example, when the inner cable 22 is expanded, the end fitting 15 is moved in the direction K in connection with the expanded length of the inner cable together with the guide plate 7 and the adjusting lever 12 by energizing of the spring 21 in the direction K. Therefore, in the next operation, the lever 2 can pull the inner cable in the direction F without altering the previous stroke, and can enoughly operate the working device.

Furthermore, when the inner cable is contracted, the end fitting 15 is moved in the direction J in connection with the contracted length of the inner cable 22 in the rest state of the lever 2, and as a result, in the next operation, the inner cable 22 can be pulled in the direction F with a certain stroke.

In addition, since the safe-stopper 23a is provided, even if the lock is not functioned by, for example, the breakdowns of the locking pins provided on the adjusting lever 12, the movable pin 11 pivotally connected to the end fitting comes into contact with the safe-stopper 23a, and the movement of the end fitting 15 in the direction J is stopped at a certain position so as to secure a minimum stroke, whereby the embodiment shown in FIGS. 1 to 5 also equips the excellent, effective device being capable of preventing an accident causing non-working of clutch.

FIGS. 6 to 10 shows other embodiment of the invention.

According to the embodiment, a lever 102 has substantially the same structure as the lever 2 described above, is pivotally connected to a shaft 101, and is provided with a first lock surface 104 and a second lock surface 105, which have circular arc shapes and which are almost concentric to each other.

In the embodiment shown in FIGS. 6 to 10, a cam plate 30 and a plate member 31 disposed on an outer surface of the cam plate are employed instead of the guide plate 7 and the lock-releasing plate 16 employed in the above-mentioned embodiment.

The cam plate 30 is provided with a laterally extending hole 32 through which a fixed pin 106 is inserted and a projecting piece 33 extending laterally in lower portion thereof, and both a first locking pin 34 and a second locking pin 35 are respectively mounted on the upper portion of the cam plate 30. A movable pin 111 which extends through a hole 123 having a circular arc shape in the lever 102 is slidably connected through the cam plate 30 to the plate member 31, and is pivotally connected to an end fitting 115 to which the inner cable 122 connected. Thus, when the lever 102 is rotated in the direction B, the cam plate 30 is rotated around the second locking pin 35 in the direction D, and the first and the second locking pins 34 and 35 are contacted wit and are pressed against the first and the second lock surfaces 104 and 105 respectively, where the cam plate 30 is locked to the lever 102 in the same manner as in the previous embodiment.

The plate member 31 being almost rectangle and disposed to the outer surface of the cam plate 30 is pivotally connected at the lower portion thereof to the fixed pin 106, has a laterally extending hole 36 for slidably engaging with the movable pin 111, and further has a notch 37 of almost a hemi-circular shape for engaging with one end of the second locking pin 35 at the upper end thereof. The plate member 31 is energized in the direction K by a spring 121.

As shown in FIG. 7, a supporting plate 112 pivotally connected to the movable pin 111 is disposed to the back surface of the lever 102 provided, and the first and the second locking pins 34 and 35 are held between the supporting plate 112 and the cam plate 30. Such a supporting plate may be substantially the same as the adjusting lever 12 in the embodiment shown in FIGS. 1 to 5. According to the embodiment shown in FIGS. 6 to 9, though the supporting plate is not always necessary since the first and the second locking pins 34 and 35 can be directly fixed to only the cam plate 30, the supporting plate 112 is preferably employed to increase a strength.

As shown in FIG. 6, the lever 102 rotating in the direction A is stopped at a certain position by a stopper 120 fixed to a vehicle body (not shown), and simultaneously a top end 33a of the projecting piece 33 provided to the cam plate 30 is contacted with the stopper 120 to position the first and the second locking pins 34 and 35 into the released state without locking against the first and the second lock surfaces 104 and 105 in the rest state that the lever 102 is not rotated.

Thus, when a pedal 103 of the lever 102 is depressed from the rest state shown in FIG. 6 to rotate the lever 102 in the direction B, as shown in FIG. 9, the above projecting piece 33 is released from the contact with the stopper 120, and simultaneously the cam plate 30 is rotated around the second locking pin 35 in the direction D. As a result, the second locking pin 35 is contacted with and is pressed against the second lock surface 105 due to the slight movement of the movable pin 111 in the direction J, and further the first locking pin 34 rotating in the direction D is also contacted with and is pressed against the first lock surface 104, whereby the cam plate 30 is fixed to the lever 102 in that position.

When the pedal 103 is further rotated, the inner cable 122 fixed to the end fitting 15 can be pulled in the direction F as shown in FIG. 10 to operate enoughly the working device connected to the other end thereof.

In the state shown in FIG. 10, when the pedal 103 is released from its depression, the lever 102 is returned in the direction A by a return spring (not shown), and is contacted with the stopper 120 to stop the movement. During the return, since the top end 33a of the projecting piece 33 is pushed by the stopper 120, the cam plate 30 is rotated in the direction C around the second locking pin 35 in connection with the depression of the projecting piece 33, is completely released from the lock, and finally is returned to the rest state shown in FIG. 6.

In the rest state, the cam plat 30 is free from the lock, due to preventing the rotation of the cam plate 30 by the stopper 120, so that the cam plate 30 is freely movable in the direction J or K around the fixed pin 106 in the state that the top end 33a of the projecting piece 33 is contacted with the stopper 120. Thus, the expansion or contraction of the inner cable 122 is compensated and is adjusted by such a movement of the cam plate 30, and therefore, the lever 102 can pull the inner cable in the direction F without altering the previous stroke so as to be able to operate enoughly the working device.

Furthermove, in the lever 102, one side edge of the hole 123 having a circular arc shape becomes a safestopper 123a, so that it can be prevented that the lock is not functioned and therefore that the operation of the clutch is not functioned.

Thus, the self-adjusting mechanism of the invention, unlike the conventional mechanism employing a ratchet member, can lock the movable pin connected to the end fitting of the inner cable to the lever at a suitable position, and can freely move the movable pin in the rest state of the lever, so that the expansion and contraction of the inner cable is compensated.

As described above, the explanations of the invention accompanying with drawings have been made as embodiments of operating side, but it will be apparent that the invention may be also applied to working side.

Furthermore, the self-adjusting mechanism of the invention is not limited to only clutch pedal lever as described above, and is preferably employed to, for example, brake, accelerator, or other various industrial mechanisms which are remotely controlled by the control cable.

What is claimed is:

1. A stroke self-adjusting mechanism for a control cable comprising a lever pivotally connected to a shaft and provided with both a first lock surface having a circular arc shape at one end thereof and a second lock surface which has a circular arc shape and which positions below and is almost concentric with the first lock surface;

a fixed pin provided at a center area of radius in said first and second lock surfaces;

a guide plate pivotally connected to said fixed pin at one end thereof and having a laterally extending hole;

an adjusting lever having a movable pin at one end thereof and having a first locking pin and a second locking pin at the other end thereof, said movable pin being slidably engaged with said laterally extending hole, said first and second locking pins being contacted with and being pressed against said first and second lock surfaces respectively when the lever is rotated, and the second locking pin being engaged with a notch provided at the guide plate;

a lock-releasing plate having vertically extending hole at one end thereof and having a lock-releasing pawl at the other end thereof, the lock-releasing plate being pivotally connected to said fixed pin by the vertically extending hole to move slidably within the guide plate;

a lock-releasing stopper being capable of contacting with the lock-releasing plate; and an end fitting pivotally connected to said adjusting lever through said movable pin, an inner cable of the control cable being connected to the end fitting at one end thereof, whereby a working device which is connected to the other end of the inner cable being remotely controlled, and an expansion or a contraction of said inner cable being able to automatically adjust.

2. The mechanism of claim 1 wherein said guide plate is energized in the direction of pulling the inner cable by a spring.

3. The mechanism of claim 1 wherein said lever has a safe-stopper for preventing the overrotation of the adjusting lever.

4. A stroke self-adjusting mechanism for a control cable comprising
- a lever pivotally connected to a shaft and provided with both a first lock surface having a circular arc shape at one end thereof and a second lock surface which has a circular arc shape and which position below and is almost concentric with the first lock surface;
- a fixed pin provided at a center area of radius in said first and second lock surfaces;
- a cam plate having a laterally extending hole for inserting said fixed pin and a projecting piece extending laterally at one end thereof, pivotally connected to a movable pin, and having a first locking pin and a second locking pin at the other end thereof, said first and second locking pins being contacted with and being pressed against said first and second lock surfaces respectively when the lever is rotated;
- a plate member disposed on an outer surface of said cam plate, pivotally connected to the fixed pin at one end thereof, having a laterally extending hole which is slidably engaged with the movable pin, and having a notch at the other end thereof for engaging with said second locking pin; and
- an end fitting being pivotally connected to said movable pin, an inner cable of the control cable being connected to the end fitting at one end thereof,
- whereby a working device which is connected to the other end of the inner cable being remotely controlled, and an expansion or a contraction of said inner cable being able to automatically adjust.

5. The mechanism of claim 4 wherein said first and second locking pins are held between said cam plate and a supporting plate to which said movable pin is fixed.

6. The mechanism of claim 4 wherein said plate member is energized in the direction of pulling the inner cable by a spring.

7. The mechanism of claim 4 wherein said lever has a safe-stopper for preventing the overrotation of the adjusting lever.

* * * * *